(12) United States Patent
Baylis et al.

(10) Patent No.: US 7,455,745 B2
(45) Date of Patent: Nov. 25, 2008

(54) LASER WELDING OF A PLASTIC MANIFOLD

(75) Inventors: Bobbye Kaye Baylis, Harrow (CA); Bruce J. Harvey, Shelby Township, MI (US); Paul D. Daly, Troy, MI (US)

(73) Assignee: Mahle International GmbH, Stuttgart (DE)

( * ) Notice: Subject to any disclaimer, the term of this patent is extended or adjusted under 35 U.S.C. 154(b) by 235 days.

(21) Appl. No.: 11/446,013

(22) Filed: Jun. 2, 2006

(65) Prior Publication Data

US 2006/0272769 A1    Dec. 7, 2006

Related U.S. Application Data

(60) Provisional application No. 60/687,482, filed on Jun. 3, 2005.

(51) Int. Cl.
B29C 65/00    (2006.01)
(52) U.S. Cl. ............. 156/272.8; 156/272.2; 123/184.21
(58) Field of Classification Search .............. 156/272.2, 156/272.8; 123/184.21
See application file for complete search history.

(56) References Cited

U.S. PATENT DOCUMENTS

| | | | |
|---|---|---|---|
| 3,974,016 A | 8/1976 | Bondybey et al. | |
| 4,670,207 A * | 6/1987 | Yamada et al. | 264/248 |
| 4,878,460 A | 11/1989 | Uchida et al. | |
| 4,911,135 A | 3/1990 | Nishimura et al. | |
| 5,156,117 A | 10/1992 | Muller et al. | |
| 5,730,817 A | 3/1998 | Feygin et al. | |
| 5,839,397 A | 11/1998 | Funabashi et al. | |
| 5,893,959 A | 4/1999 | Muellich | |
| 6,098,576 A | 8/2000 | Nowak, Jr. et al. | |
| 6,199,530 B1 | 3/2001 | Brassell et al. | |
| 6,220,207 B1 | 4/2001 | Kawasaki et al. | |
| 6,234,129 B1 | 5/2001 | Brassell et al. | |
| 6,234,130 B1 | 5/2001 | Brassell et al. | |
| 6,234,131 B1 * | 5/2001 | Brassell et al. | 123/184.21 |
| 6,267,093 B1 | 7/2001 | Lohr | |
| 6,279,528 B1 | 8/2001 | Happenhofer et al. | |
| 6,321,697 B1 | 11/2001 | Matsuda et al. | |
| 6,321,708 B1 | 11/2001 | Wehner et al. | |
| 6,394,162 B2 | 5/2002 | Gizowski et al. | |
| 6,397,578 B2 | 6/2002 | Tsukamoto et al. | |
| 6,446,591 B1 | 9/2002 | Chae et al. | |
| 6,467,449 B2 | 10/2002 | Brassell et al. | |
| 6,532,928 B2 | 3/2003 | Ogata | |
| 6,564,783 B2 | 5/2003 | Chou et al. | |
| 6,596,122 B1 * | 7/2003 | Savitski et al. | 156/304.2 |

(Continued)

FOREIGN PATENT DOCUMENTS

EP    1 174 247    1/2002

(Continued)

*Primary Examiner*—John L. Goff
*Assistant Examiner*—Daniel McNally
(74) *Attorney, Agent, or Firm*—Carlson, Gaskey & Olds

(57) ABSTRACT

An example plastic intake manifold is assembled with an inner shell received within an outer shell. The method of assembling the outer shell to the inner shell comprises a localized thickness that defines a desired laser weld joint along which laser energy is utilized to form the desired joint between the outer shell and the inner shell. The method also provides for completing a desired weld around an interfering protrusion on an outer surface of the outer shell.

10 Claims, 4 Drawing Sheets

U.S. PATENT DOCUMENTS

| | | |
|---|---|---|
| 6,604,515 B2 | 8/2003 | Marsh et al. |
| 6,634,420 B2 | 10/2003 | Gokan et al. |
| 6,739,301 B2 | 5/2004 | Brassell et al. |
| 6,857,409 B2 | 2/2005 | Ito et al. |
| 7,191,750 B2 * | 3/2007 | Daly et al. ............. 123/184.61 |
| 2003/0132554 A1 * | 7/2003 | Grosser et al. ............... 264/482 |
| 2004/0031562 A1 * | 2/2004 | Kaiser et al. ............. 156/272.8 |
| 2005/0217627 A1 * | 10/2005 | Daly et al. ............. 123/184.61 |

FOREIGN PATENT DOCUMENTS

| | | |
|---|---|---|
| JP | 62 49850 | 10/1987 |
| JP | 5 42336 | 6/1993 |
| JP | 2003328881 A * | 11/2003 |

* cited by examiner

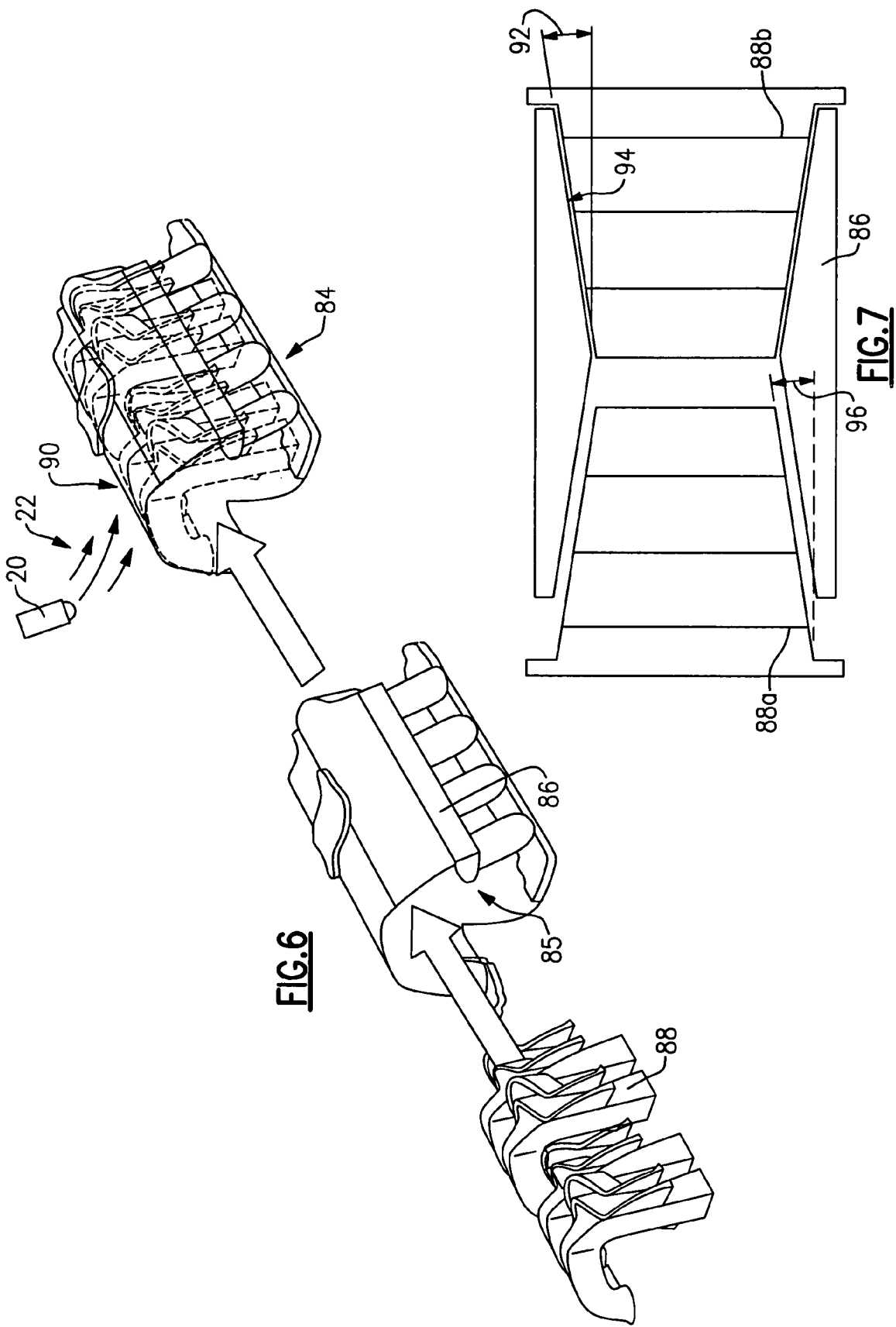

LASER WELDING OF A PLASTIC MANIFOLD

CROSS REFERENCE TO RELATED APPLICATION

The application claims priority to U.S. Provisional Application No. 60/687,482 which was filed on Jun. 3, 2005.

BACKGROUND OF THE INVENTION

This invention relates to the fabrication of a plastic article. More particularly, this invention relates to a method and system for laser welding a plastic manifold.

Plastic manifolds have become increasingly utilized in automotive applications because they provide advantages including the reduction of weight, and cost as compared to manifolds fabricated utilizing metal alloys. Further, plastic intake manifolds allow the formation of shapes that are otherwise difficult, and cost prohibitive with the casting methods required for utilizing metal alloys.

The fabrication of a plastic manifold includes the joining of several different parts into a completed manifold. Joining of the different parts is often performed by ultrasonic, or vibration welding. Ultrasonic and vibration welding require relatively complex joint configurations between each of the different parts. Further, due to the complex joint configuration, a complete intake manifold may require many parts that are joined in several different joining operations. As appreciated, each operation contributes detrimentally to the potential for defects and overall cost.

An improved method of joining plastic manifold parts includes the use of a laser beam for welding the desired parts together. A laser welding process utilizes a laser beam to melt plastic in a localized region between the two parts to be joined. Typically, only a simple lap joint is required between parts. The laser welding process utilizes a laser transparent material through which the laser beam is directed. A laser absorbent material is disposed against the laser transparent part on a side opposite the laser beam. Laser energy is transmitted through the laser transparent part and absorbed by the laser absorbent part. The absorbed laser energy heats and melts the two parts in the localized area between the two pieces. The molten plastic is then allowed to cool forming the desired joint.

Laser welding requires a minim gap between the two parts to be welded, or the laser energy and heat from the laser does not sufficiently heat the two parts that are to be joined. Further, the laser beam must be aligned with the joint in such a way as to align the focal point of the laser beam such that it heats the two parts. Any discontinuities or surface features that interfere with the path of the laser beam can disrupt the focal point of the laser beam. Additionally, because laser energy is focused to provide the desired energy at a point within the material, the thickness of the part is typically preferred to be substantial uniform. The uniformity of the parts provides the penetration of the laser energy that in turn provides the desired joint.

Disadvantageously, the requirements on part design to facilitate laser welding can limit the desired appearance and design of a plastic part. Further, in some instances, variations in part thickness are desired to provide specific desired performance features. Additionally, some applications are not attempted with laser welding due to desired surface features that complicate the laser welding process.

Accordingly, it is desirable to design a method and system for applying laser welding processes to plastic articles having differing exterior configurations.

SUMMARY OF THE INVENTION

An example plastic intake manifold is assembled with an inner shell received within an outer shell. The method of assembling the outer shell to the inner shell comprises a localized thickness that defines a desired weld joint along which laser energy is utilized to form the desired joint between the outer shell and the inner shell.

The localized thickness or trough is less than the thickness in the surrounding area of the plastic part. The underlying inner shell is fabricated from laser opaque material that absorbs laser energy to facilitate the desired joint between the inner ant outer shells. The reduced thickness within the trough reduces the magnitude of laser energy required for the welding operation without sacrificing strength. The completed joint includes both the thickness of the outer shell within the trough, but also the thickness of the inner shell that is attached to the outer shell. Thereby, the desired minimum wall thickness is maintained while also reducing the magnitude of energy required to facilitate the desired weld depth.

Further, the method includes steps for completing a desired weld around an interfering protrusion on an outer surface of the outer shell. The laser device and welding operation performs as desired for a substantially uniform part thickness. Ribs, flanges and other protrusions on the outer surface of the outer shell provide a substantially non-uniform part thickness. The method according to this invention directs laser energy at an angle relative to normal to extend the reach of laser energy under the protrusion, such that a complete, continuous joint can be provided through the protrusion.

The method further includes steps for reducing the amount of taper required on an inner cavity of the outer shell. The outer shell is a plastic molded part, and as such a certain amount of draft is required as is required in common accepted molding practices. The laser welding process performs best at uniform thickness and depths. The draft angle on the inside of an outer shell can be large in some instance for larger intake manifolds. The increased draft provides a challenge to the laser welding process.

The method of this invention utilizes two inner shells that are received in opposite ends of an outer shell. The outer shell is formed with a core on either end that meets at a midway point of the manifold. The draft is therefore only required to extend half way through the manifold and therefore is of a reduced magnitude from the beginning of the taper to the end of the taper, thereby reducing the overall required draft angle.

Accordingly, the example method and system of assembling an intake manifold provides improvements that overcome design obstacles to the utilization of laser welding techniques.

These and other features of the present invention can be best understood from the following specification and drawings, the following of which is a brief description.

BRIEF DESCRIPTION OF THE DRAWINGS

FIG. 6 is a schematic view of example components that form an example intake manifold.

FIG. 7 is a schematic view of another method of assembling an example intake manifold.

DETAILED DESCRIPTION OF THE PREFERRED EMBODIMENT

Figure 1:
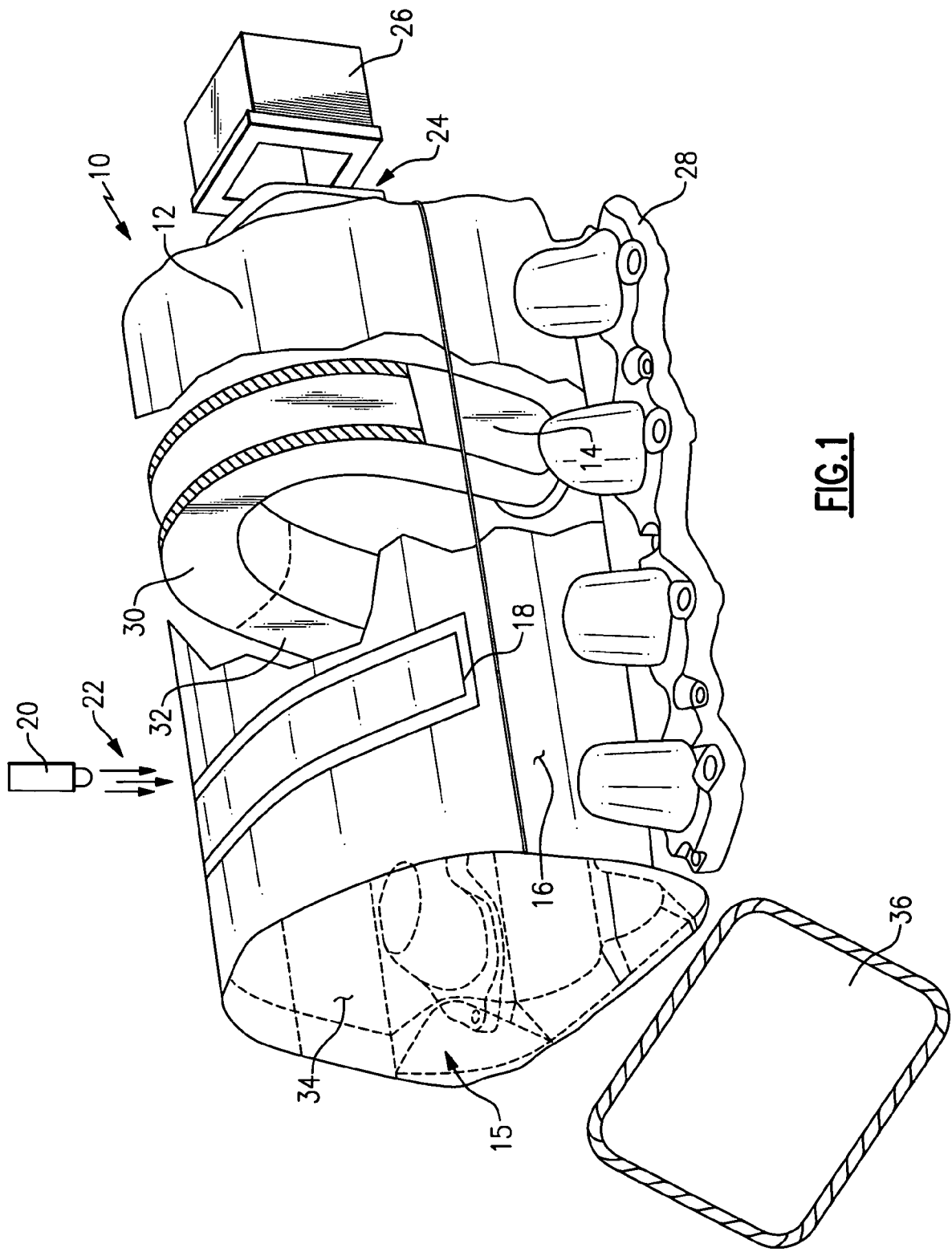
FIG. 1 is a partially cut-away view of an example intake manifold.

Referring to FIG. 1, an example intake manifold assembly 10 includes an outer shell 12 that defines an inner cavity 15 that receives an inner shell 14. The inner cavity 15 includes an inner surface 34 to which portions of the inner shell 14 are laser welded. A laser device 20 generates laser energy 22 that is directed along a defined joint path that is defined by a trough 18.

The outer shell 12 includes a throttle body mounting flange 24 for mounting a throttle body 26. The outer shell 12 also includes mounting flanges 28 for mounting the intake manifold assembly to an engine (not shown). The outer shell 12 includes a bottom portion. The bottom portion extends below a plane defined by the plurality of mounting flanges 28. The cavity 15 is open on one end for receiving the inner shell 14. The closed end of the cavity 15 includes an opening for the receiving air from the throttle body 26. A cover 36 is attached to outer shell 12 to enclose and seal the intake manifold assembly.

The inner shell 14 forms air passages through which air and in some applications an air fuel mixture flow to a specific combustion chamber of the engine. The air passages defined by the inner shell 14 are configured to provide the desired length of air passage that is substantially equal for each of the combustion chambers. The inner shell 14 includes a portion including a substantially U-shaped cross-section 30 and an enclosed section 32. The enclosed section 32 is tubular and forms ends of the air passages for directing air received through the throttle body 26 into the engine combustion chambers.

The U-shaped portion 30 includes walls that abut the inner surface 15 of the outer shell 12. The U-shaped portions 30 are thereby enclosed once welded to the inner surface 34 of the cavity 15. The trough 18 outlines the path that the laser device 20 follows.

The laser welding operation includes the use of laser transparent material and a laser opaque material. A substantial amount of laser energy is transmitted through the laser transparent material to the underlying laser opaque material. The laser opaque material absorbs the laser energy that in turn heats and melts the laser opaque material in a localized area. The melted laser opaque material transfers heat to the adjacent laser transparent material, causing some of the adjacent laser transparent material to melt. As the laser device 20 moves along the desired weld path, material is melted, intermingled between the two parts to be joined and refrozen to provide the desired joint.

In the example, the outer shell 12 comprises laser transparent material and the inner shell 14 comprises the laser opaque material. The types of material can be reversed to accommodate application specific criteria. However, in each example, one material is laser transparent and another is laser opaque or absorbent.

The laser device 20 emits laser energy 22 to provide the desired penetration and weld depth given a thickness of plastic material that includes the outer shell 12 and the inner shell 14. In the example illustrated method, the trough 18 defines the path that the laser device 20 travels. Further, the trough 18 corresponds with the wall of the inner shell 14 disposed within the outer shell 12.

Figure 2:
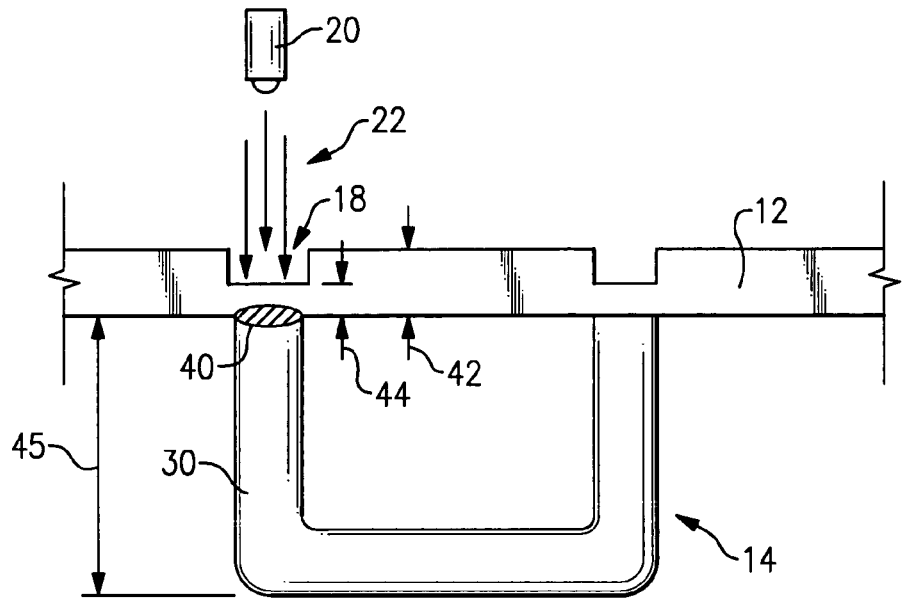
FIG. 2 is an enlarged cross-section of a portion of the example intake manifold.

Referring to FIG. 2, a fixed level of laser energy 22 will penetrate a uniform depth for a given thickness of plastic. As appreciated, greater depths require greater amounts of energy. The example trough 18 provides for a reduction in the amount of laser energy required, while still providing the desired thickness of plastic in the joint between the outer shell 12 and the inner shell 14.

The example outer shell 12 includes the trough 18 that includes a thickness 44 that is less than a thickness 42 of other non-trough areas of the plastic outer shell 12. The thickness in the area of the weld includes the thickness of the outer shell in the trough 44 along with the "thickness" or length 45 of the inner shell 14. Thereby, any minimum thickness requirement is more than fulfilled in the joint areas. Laser energy 22 passes through the laser transparent outer shell 12 and is absorbed at by the laser opaque inner shell 14. The absorbed laser energy generates the desired weld 40 between the two parts.

Figure 3:
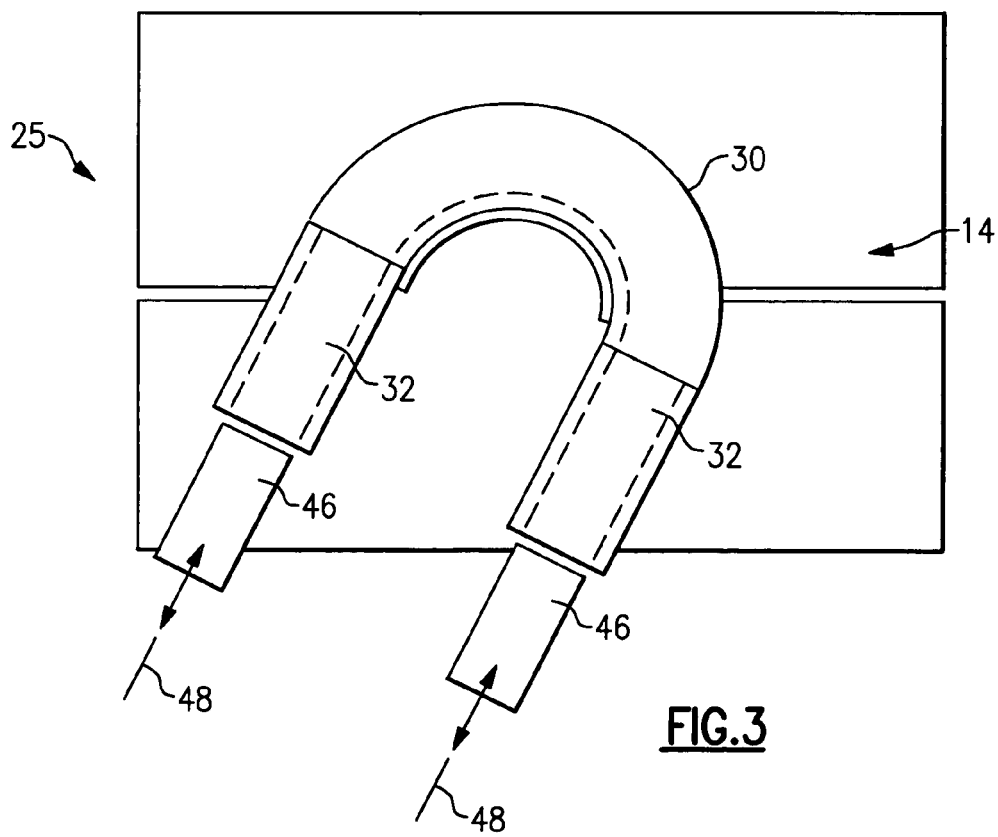
FIG. 3 is a schematic view of an example process for fabricating an inner shell.

Referring to FIG. 3, the example inner shell 14 defines an air flow passage that supplies air to a combustion chamber. It is known to provide separate equal length air passages for each combustion chamber to provide even and stable combustion and engine performance. Accordingly, to maintain the desired air passage length for a desired application, the inner shell 14 comprises a curved passage. The curved passage comprises a portion 30 that is substantially U-shaped in cross-section and two straight portions 32 that form an enclosed shape in cross-section.

A plastic injection mold 25 (schematically shown) is utilized to fabricate the inner shell 14. The two straight portions 32 are formed by inserts 46 that move within the mold 25. The U-shaped portion 30 is formed in a surface of the mold cavity. As the U-shaped portion 30 includes an open section, it can be formed as is know through a configured mold cavity. The straight portions 32 are formed by parallel moving inserts 46. The configuration of the inner shell 14 provides for the substantially parallel movement of the two inserts 46 to ease molding and increase fabrication efficiencies.

Figure 4:
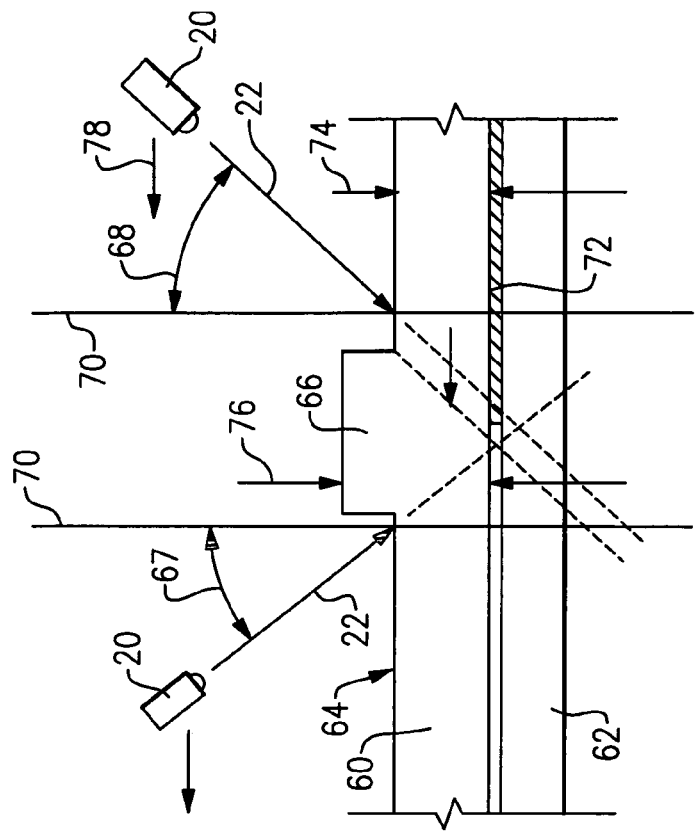
FIG. 4 is a schematic view of an example laser weld process.

Referring to FIG. 4, as the laser device 20 provides a substantially uniform beam of laser energy 22, any discontinuity or protrusion that increases the thickness in a weld joint region also requires an increase in laser energy. However, in some instances the desired protrusions increase the thickness to such a degree as to make any increase in laser energy impractical. The example method of this invention provides for providing a weld joint under such protrusions without the undesirable increase in laser energy.

The example method according to this invention includes directing the laser energy 22 at an angle 68 relative to normal 70 to the outer surface 64 of an outer shell 60. In this way, the laser energy 22 is directed forward of the laser device 20 and under a protrusion within the desired weld path. The laser energy 22 is thereby directed at least part way, under the protrusion to form a desired continuous weld 72. The laser device 20 continuously tracks in a one direction 78. Initially, the laser device 20 is angled at a first angle 68 such that laser energy 22 extends forward of the laser device 20 in the direction of movement 78. This angled direction provides a weld bead 72 that extends at least midway past the beginning of the protrusion.

The laser device 20 can then be shut off and cycled to a second angle 67 past the protrusion, such that the directed laser energy 22 now trails movement of the laser device 20. The trailing directed laser energy 22 extends beneath the protrusion to intersect with the end of the weld 27 formed by the laser device 20 from the initial side of the protrusion 66. Accordingly, a substantially continuous weld 72 is formed without increasing the amount of laser energy 22 emitted from the laser device.

Figure 5:
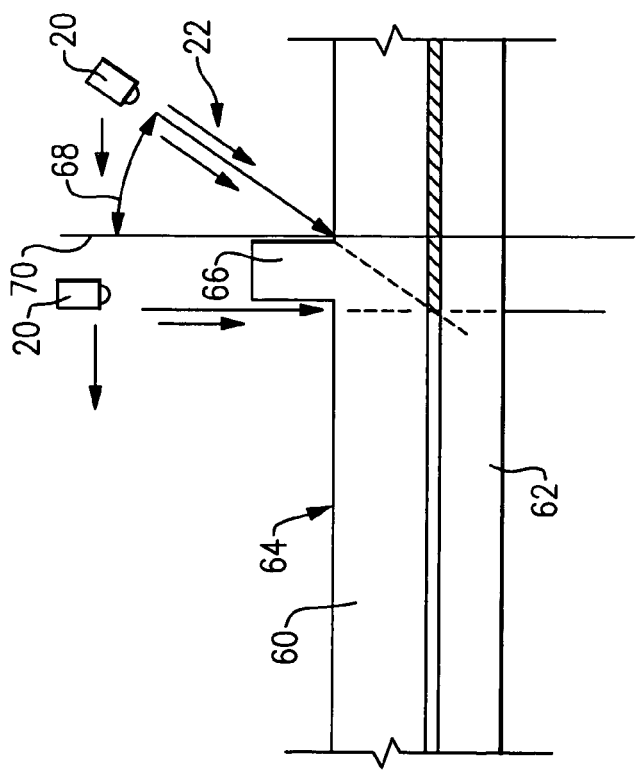
FIG. 5 is a schematic view of another example laser welding process.

Referring to FIG. 5, for smaller protrusions 66, the initial angle 68 provided such that the laser energy 22 leads the trailing laser device 22 may be sufficient to reach entirely under the protrusion 66. In this example, the device 20 can then be returned to a normal orientation relative to the surface 64 of the outer shell 60. This being possible because the forward angle 68, and the width of the protrusion, provided for the weld 72 to extend substantially the entire width of the protrusion 66. Preferably, the angle from normal will not exceed 60 degrees. However, lesser angles as are required for the formation of a weld 72 under a protrusion are within the contemplation of this invention.

Referring to FIG. 6, another example plastic intake manifold assembly 84 includes an outer shell 86 that receives an inner shell 88. The inner shell 88 is substantially equal in length to the outer shell 86. The laser device 20 is then utilized to provide a desired joint along a defined weld joint path 90.

As the outer shell 86 is fabricated utilizing a plastic injection mold, a defined amount of draft or taper is provided in the cavity 85. It is desirable for a laser welding operation to include a substantially uniform depth to the joint to provide the desired melt uniformity. The draft required for molding the cavity 85 can be substantial for relatively long manifold assemblies, and in turn, translate to a significant difference in thickness between ends of the intake manifold assembly 84.

Referring to FIG. 7, an example manifold assembly 87 includes a draft 92 that extends from both ends of the cavity 85. In this way, the magnitude of difference between the thickness in the center region and at the ends is minimal. The draft angles 92 are exaggerated for illustrative purposes to illustrate the impact on overall part thickness. If the draft angle 92 were extended across the entire length of the example intake manifold assembly 87, the differences in wall thickness between ends would by substantial and require substantial compensation by the laser device 20.

Further, the inner shell comprises a first inner shell 88*a* and a second inner shell 88*b*. The first and second inner shells 88*a* and 88*b* include a corresponding taper 96 (also exaggerated for illustrative purposes). The example method forms the cavity through the use of inserts that are withdrawn from opposite ends of the outer manifold 86 to reduce the overall difference in wall thickness. Thereby, a more uniform joint depth is provided to increase the efficiency of the laser welding methods for fabricating the intake manifold assembly 87.

Accordingly, the example method and assemblies disclosed herein provide for improved fabrication and assembly of a plastic intake manifold. Further, the example method provides for the design and inclusion of features not feasible utilizing conventional techniques.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A method of fabricating a plastic intake manifold comprising the steps of:
   a) defining an outer shell comprised of a laser transparent material, the outer shell including an protrusion extending outward from a surface of the outer shell;
   b) defining an inner shell comprised of a laser opaque material;
   c) defining a joint path between the inner shell and the outer shell that includes the protrusion; and
   d) directing laser energy at a first angle relative to normal through the outer shell such that laser energy is directed against a portion of the inner shell located opposite the protrusion, wherein laser energy is not directed through the protrusion.

2. The method as recited in claim 1, wherein a path of the directed laser energy tracks the defined joint up to the protrusion, and the angle relative to normal is defined such that laser energy extends through the outer shell to the inner shell disposed normal to the protrusion.

3. The method as recited in claim 1, including directing laser energy back through the laser transparent part at a second angle on a side opposite the protrusion from the side of the protrusion through which laser energy was directed at the first angle relative to normal.

4. A method of fabricating a plastic intake manifold comprising the steps of:
   a) defining an outer shell comprised of a laser transparent material, the outer shell including an protrusion extending outward from a surface of the outer shell;
   b) defining an inner shell comprised of a laser opaque material;
   c) defining a joint path between the inner shell and the outer shell that includes the protrusion; and
   d) directing laser energy at a first angle relative to normal through the outer shell such that laser energy is directed against a portion of the inner shell located opposite the protrusion, wherein a portion of the outer shell within the defined joint path includes a thickness less then a thickness of the outer shell not within the defined joint path.

5. The method as recited in claim 4, wherein the portion of the defined joint path including a thickness less than a thickness of the outer shell comprises a trough.

6. The method as recited in claim 4, wherein the inner shell is aligned with the defined joint path and includes a wall thickness, wherein a width of the defined joint path is no less than equal to the wall thickness.

7. A method of fabricating a plastic intake manifold comprising the steps of:
   a) defining an outer shell comprised of a laser transparent material, the outer shell including an protrusion extending outward from a surface of the outer shell;
   b) defining an inner shell comprised of a laser opaque material;
   c) defining a joint path between the inner shell and the outer shell that includes the protrusion; and
   d) directing laser energy at a first angle relative to normal through the outer shell such that laser energy is directed against a portion of the inner shell located opposite the protrusion, wherein the step of defining the inner shell comprises forming two portions with a substantially enclosed cross-section which are connected by a portion with a substantially U-shaped cross-section.

8. The method as recited in claim 7, wherein the U-shaped cross-section and enclosed cross-sections are formed concurrently.

9. A method of fabricating a plastic intake manifold comprising the steps of:
   a) defining an outer shell comprised of a laser transparent material, the outer shell including an protrusion extending outward from a surface of the outer shell;

b) defining an inner shell comprised of a laser opaque material;
c) defining a joint path between the inner shell and the outer shell that includes the protrusion; and
d) directing laser energy at a first angle relative to normal through the outer shell such that laser energy is directed against a portion of the inner shell located opposite the protrusion, wherein the outer shell comprises first and second open ends and an inner surface including a first taper extending from the first end to a substantial midway point of the inner surface and a second taper that extends from the second end to substantially the midway point.

10. The method as recited in claim 9, wherein the inner shell comprises a first inner shell that includes an outer surface having a taper corresponding to the first taper of the outer shell and a second inner shell having an outer surface having a taper corresponding to the second taper of the outer shell.

* * * * *